(12) United States Patent
Ota

(10) Patent No.: US 11,555,713 B2
(45) Date of Patent: Jan. 17, 2023

(54) ALERTING DEVICE OF ELECTRICALLY POWERED VEHICLE

(71) Applicant: TOYOTA JIDOSHA KABUSHIKI KAISHA, Toyota (JP)

(72) Inventor: Yoshifumi Ota, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 158 days.

(21) Appl. No.: 16/782,563

(22) Filed: Feb. 5, 2020

(65) Prior Publication Data

US 2020/0256700 A1 Aug. 13, 2020

(30) Foreign Application Priority Data

Feb. 8, 2019 (JP) .............................. JP2019-021697

(51) Int. Cl.
| | |
|---|---|
| *G01C 21/36* | (2006.01) |
| *B60L 58/12* | (2019.01) |
| *G01C 21/34* | (2006.01) |

(52) U.S. Cl.
CPC .......... *G01C 21/3697* (2013.01); *B60L 58/12* (2019.02); *G01C 21/343* (2013.01); *G01C 21/3469* (2013.01); *G01C 21/3664* (2013.01); *B60L 2240/70* (2013.01); *B60L 2250/10* (2013.01); *B60L 2260/52* (2013.01)

(58) Field of Classification Search
CPC .......... Y02T 90/16; Y02T 90/14; Y02T 10/70
See application file for complete search history.

(56) References Cited

U.S. PATENT DOCUMENTS

| | | | | |
|---|---|---|---|---|
| 9,132,746 | B2* | 9/2015 | Enomoto | ................ B60L 53/62 |
| 9,610,853 | B1* | 4/2017 | Miller | ..................... B60L 53/60 |
| 9,937,794 | B2* | 4/2018 | Bellin | ................... B60L 53/665 |
| 10,101,171 | B2* | 10/2018 | Abuelsaad | ......... G01C 21/3469 |
| 10,976,170 | B2* | 4/2021 | Morgan-Brown | ...... B60L 58/12 |
| 2004/0062963 | A1* | 4/2004 | Umayahara | ....... H01M 8/04303 |
| | | | | 429/429 |
| 2013/0009765 | A1* | 1/2013 | Gilman | ................... B60L 53/14 |
| | | | | 340/455 |
| 2015/0073636 | A1* | 3/2015 | Machino | .................. B60L 3/12 |
| | | | | 701/22 |

(Continued)

FOREIGN PATENT DOCUMENTS

| | | |
|---|---|---|
| JP | 2011-193547 A | 9/2011 |
| WO | 2013/124967 A1 | 8/2013 |
| WO | 2013/145214 A1 | 10/2013 |

*Primary Examiner* — Jeffrey C Boomer
(74) *Attorney, Agent, or Firm* — Sughrue Mion, PLLC

(57) ABSTRACT

An input of a destination and an input of a desired number of power supply facilities via which a vehicle travels on a route from a present location to the destination until an amount of power available becomes 0 are received. The number of facilities are selected and the route to the destination via the number of facilities is specified, the number of facilities being selected such that an amount of power with which the vehicle is able to travel a distance obtained by adding a margin distance to a distance to a farthest facility is less than the amount of power available when the route is specified. An alert is reported when the amount of power available is less than an amount of power required to travel the distance obtained by adding the margin distance to the distance to the farthest facility of the selected facilities.

3 Claims, 3 Drawing Sheets

(56) References Cited

U.S. PATENT DOCUMENTS

2015/0153195 A1* 6/2015 Burlingham ....... G01C 21/3469
701/123
2016/0339799 A1* 11/2016 Hellgren ........... B60W 50/0097
2016/0364224 A1* 12/2016 Tuukkanen ............. G06F 8/656

* cited by examiner

FIG.3

| WARNING: AMOUNT OF POWER REMAINING IN BATTERY DECREASED | |
|---|---|
| PRESENT TRAVELABLE DISTANCE | 100km |
| AIR CONDITIONER: ON   TRAVELING MODE: ECO | |
| PRESENT LOCATION → CHARGING SPOT (1) | 30km |
| CHARGING SPOT (1) → CHARGING SPOT (2) | 30km |
| CHARGING SPOT (2) → CHARGING SPOT (3) | 30km |
| EXTRA TRAVELABLE DISTANCE | 10km |

ALERTING DEVICE OF ELECTRICALLY POWERED VEHICLE

This nonprovisional application is based on Japanese Patent Application No. 2019-021697 filed on Feb. 8, 2019, with the Japan Patent Office, the entire contents of which are hereby incorporated by reference.

BACKGROUND

Field

The present disclosure relates to an alerting device of an electrically powered vehicle, particularly, an alerting device of an electrically powered vehicle suitable for reporting decrease of an amount of power available in a power storage device.

Description of the Background Art

Conventionally, there has been an electric vehicle (for example, Japanese Patent Laying-Open No. 2011-193547) in which: a driving mode switching variable is maintained or increased when the nearest main charging facility and another sub charging facility can be reached from the present location in a normal driving mode using an amount of remaining power in a power storage device at present; and the driving mode switching variable is decreased when at least one of the main charging facility and the sub charging facility cannot be reached in the normal driving mode. In such an electric vehicle, load control is performed to correspond to a power-saving driving mode set to gradually decrease an amount of power consumption as the driving mode switching variable is decreased.

SUMMARY

In the electric vehicle of Japanese Patent Laying-Open No. 2011-193547, however, when the main charging facility and the sub charging facility reached by the electric vehicle cannot be used because the main charging facility and the sub charging facility are broken or occupied, power is insufficient to move to a next charging facility even if the load control is performed to correspond to the power-saving driving mode, with the result that it may become impossible to reach a charging facility. In such a case, a user has a feeling of anxiety that power available in the power storage device will run out.

The present disclosure has been made to solve such a problem, and has an object to provide an alerting device of an electrically powered vehicle so as to provide a user with a feeling of assurance by a manner of routing via power supply facilities and improve the user's feeling of assurance by informing the user of a possibility of insufficiency of power available in the power storage device.

An alerting device of an electrically powered vehicle according to the present disclosure is an alerting device of an electrically powered vehicle including a power storage device that supplies power to be used for traveling, the alerting device including: an input unit that receives an input of a destination from a user and that receives, from the user, an input of a desired number of power supply facilities via which the electrically powered vehicle travels on a route from a present location to the destination until an amount of power available in the power storage device becomes 0; a controller that selects the desired number of power supply facilities and that specifies the route to the destination received by the input unit via the selected desired number of power supply facilities in order from a power supply facility nearest to the present location, the desired number of power supply facilities being selected such that an amount of power with which the electrically powered vehicle is able to travel a distance obtained by adding a margin distance to a distance to a farthest power supply facility is less than the amount of power available in the power storage device when the route is specified; and a reporting unit that reports an alert to the user when, during traveling on the route specified by the controller, the amount of power available in the power storage device is less than an amount of power required to travel the distance obtained by adding the margin distance to the distance to the farthest power supply facility of the power supply facilities selected by the controller. Preferably, the margin distance is able to be set by the user.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 3 shows an exemplary alerting screen in the present embodiment.

DESCRIPTION OF THE PREFERRED EMBODIMENTS

Figure 1:
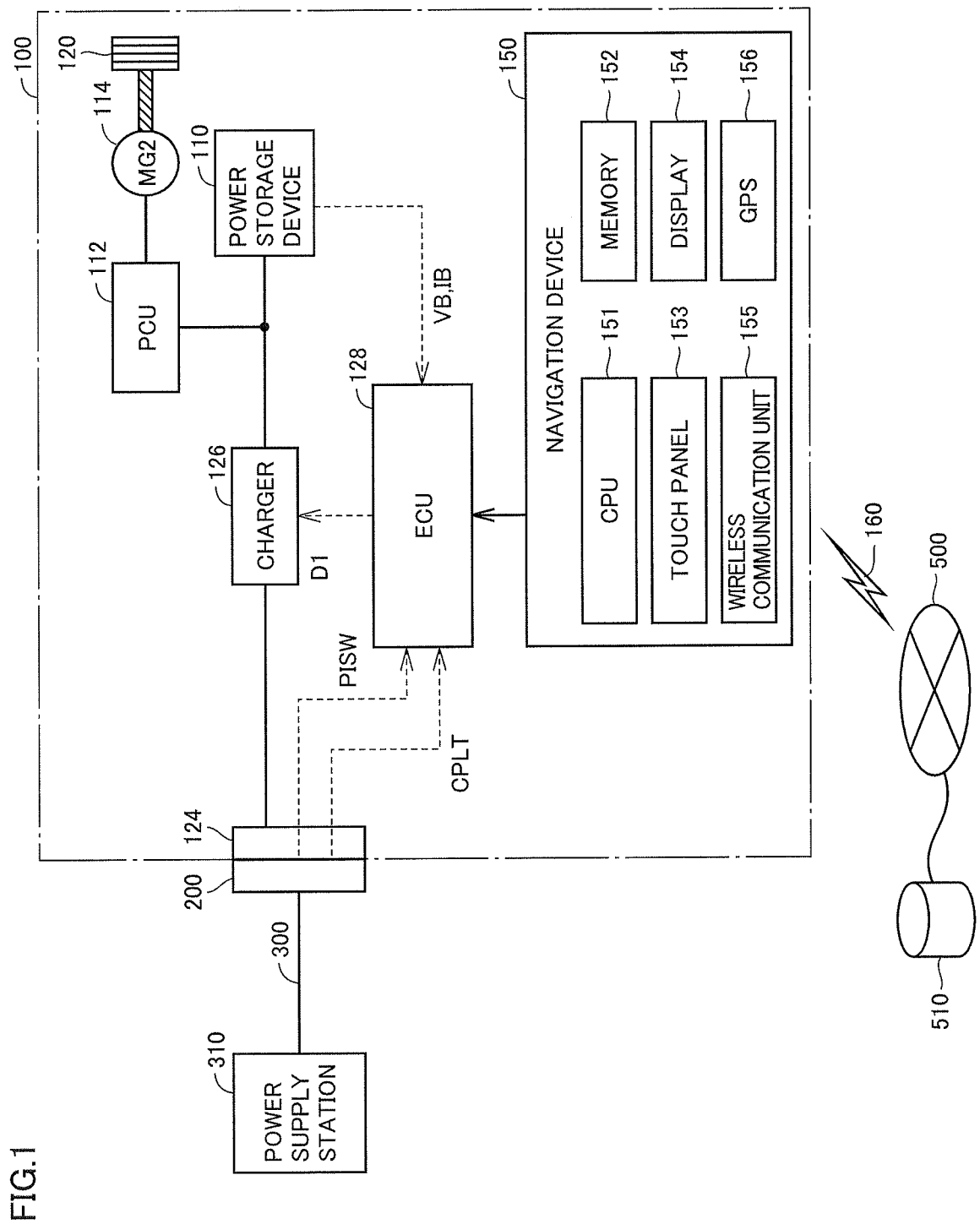
FIG. 1 is a schematic diagram schematically showing an entire configuration of an electrically powered vehicle according to an embodiment of the present disclosure.

The following describes embodiments of the present disclosure with reference to figures in detail. It should be noted that the same or corresponding portions in the figures are given the same reference characters and are not described repeatedly.

FIG. 1 is a schematic diagram schematically showing an entire configuration of an electrically powered vehicle 100 according to an embodiment of the present disclosure. With reference to FIG. 1, electrically powered vehicle 100 includes a power storage device 110, a PCU (Power Control Unit) 112, a motor generator 114, driving wheels 120, an ECU (Electronic Control Unit) 128, and a navigation device 150.

Power storage device 110 is a rechargeable power storage element. Power storage device 110 is configured to include a secondary battery such as a lithium ion battery, a nickel-metal hydride battery, or a lead storage battery, or include a storage element such as an electric double layer capacitor, for example. An output voltage of power storage device 110 is about 200 V, for example.

Power storage device 110 is electrically connected to PCU 112 via a relay (not shown). Power storage device 110 supplies electric power to PCU 112 so as to generate driving power of electrically powered vehicle 100. Further, power storage device 110 receives, from PCU 112, electric power generated by motor generator 114 and is charged therewith. Thus, electric power can be exchanged between power storage device 110 and motor generator 114.

Power storage device 110 is provided with a voltage sensor and a current sensor (both not shown). Voltage VB and current IB of power storage device 110 detected by these sensors are output to ECU 128.

PCU 112 generally represents a power conversion device for driving motor generator 114. PCU 112 includes: an inverter that drives motor generator 114; a converter that boosts an input voltage of the inverter to be more than or equal to the voltage of power storage device 110; and the like.

Motor generator 114 is an AC rotating electrical machine, such as a permanent-magnet type synchronous motor including a rotor having a permanent magnet embedded therein. Output torque of motor generator 114 is transmitted to driving wheels 120 to travel electrically powered vehicle 100. Motor generator 114 is capable of generating electric power using rotational force from driving wheels 120 during regenerative braking of electrically powered vehicle 100.

ECU 128 includes a CPU (Central Processing Unit), a signal detection circuit, an input/output buffer, a storage device, and the like (all not shown). ECU 128 receives various types of signals and outputs a control signal to each device. ECU 128 controls each device of electrically powered vehicle 100. It should be noted that the above-described control is not limited to the process by software, but can be carried out by dedicated hardware (an electronic circuit).

ECU 128 has a function of calculating a state of charge (SOC) of power storage device 110 based on detection values of voltage VB and current IB from power storage device 110. Further, during traveling of electrically powered vehicle 100, ECU 128 controls an output of motor generator 114 to generate driving force or braking force of the vehicle in accordance with a driver's operation (accelerator operation and brake operation).

Further, electrically powered vehicle 100 includes an inlet 124 and a charger 126 as a configuration for exchanging power between electrically powered vehicle 100 and outside of electrically powered vehicle 100 via a connector 200. Power storage device 110 is electrically connected to charger 126 via a relay (not shown).

Inlet 124 of electrically powered vehicle 100 is connectable to connector 200 coupled to a power cable 300. Power cable 300 transmits power between connector 200 and a power supply station 310. Power supply station 310 supplies power to electrically powered vehicle 100 via power cable 300.

Electrically powered vehicle 100 receives, from charger 126, power supplied from power supply station 310, whereby power storage device 110 can be charged. In the description below, charging of power storage device 110 using a power supply external to the vehicle will be also referred to as "external charging". During the external charging, power is supplied from power supply station 310 to inlet 124 via power cable 300 and connector 200. Charger 126 is controlled in accordance with a control signal D1 from ECU 128 to covert AC power received from inlet 124 into charging power for power storage device 110. It should be noted that the charging is not limited to AC (Alternating Current) charging in which the received power is AC power, and may be DC (Direct Current) charging in which the received power is DC power. Moreover, the charging may be fast charging.

ECU 128 receives control signals PISW, CPLT from connector 200 via inlet 124. For example, control signal CPLT is a pulse signal having information indicating a rated current of power cable 300. Moreover, control signal PISW is generated to have a potential that differs depending on a connection state of connector 200 to inlet 124 (whether or not connector 200 is connected to inlet 124). As a result, based on control signal PISW, ECU 128 can detect whether or not connector 200 is connected to inlet 124, i.e., whether or not power storage device 110 can be charged via the path formed between electrically powered vehicle 100 and the outside of electrically powered vehicle 100.

Navigation device 150 includes: a CPU (Central Processing Unit) 151 that performs a predetermined process; a memory 152 that stores information; a touch panel 153 to which the user can provide an input by way of touch; a display 154 that presents information; a wireless communication unit 155 that wirelessly communicates with an external device; and a GPS (Global Positioning System) 156 that specifies a location. Navigation device 150 presents, on the display, a traveling route to a destination in accordance with the information input from the touch panel. Navigation device 150 obtains location information of electrically powered vehicle 100 through GPS 156. Specifically, navigation device 150 can obtain the location information of electrically powered vehicle 100 by receiving electric waves from GPS satellites (not shown). Further, navigation device 150 has road map information in memory 152. When a destination is set by an input from touch panel 153, CPU 151 searches for a traveling route from the location of electrically powered vehicle 100 to the destination based on the road map information. For example, in navigation device 150, the user can set a destination from touch panel 153. Navigation device 150 presents the searched traveling route on display 154. Moreover, navigation device 150 can obtain information from ECU 128, such as the SOC of power storage device 110.

Further, navigation device 150 is connected to a wide area network 500 (representatively, the Internet) via a communication path 160 formed by wireless communication unit 155, so as to obtain, from a data center 510, information about the destination, power supply station 310, and the like.

Conventionally, there has been an electrically powered vehicle in which: a driving mode switching variable is maintained or increased when the nearest main charging facility 310X and another sub charging facility 310Y can be reached from the present location in a normal driving mode using an amount of remaining power in power storage device 110 at present; and the driving mode switching variable is decreased when at least one of main charging facility 310X and sub charging facility 310Y cannot be reached in the normal driving mode. Load control is performed to correspond to a power-saving driving mode set to gradually decrease a power consumption amount as the driving mode switching variable is decreased.

However, when main charging facility 310X and sub charging facility 310Y reached by the electrically powered vehicle cannot be used because main charging facility 310X and sub charging facility 310Y are broken or occupied, power is insufficient to move to a next charging facility 310Z even if the load control is performed to correspond to the power-saving driving mode, with the result that it may become impossible to reach a charging facility 310. In such a case, a user has a feeling of anxiety that power available in power storage device 110 will run out.

To address this, navigation device 150 of electrically powered vehicle 100 according to the present disclosure is a navigation device 150 of an electrically powered vehicle 100 including a power storage device 110 that supplies power to be used for traveling. Navigation device 150 receives an input of a destination from a user, and receives, from the user, an input of a desired number of power supply stations 310 via which electrically powered vehicle 100 travels on a route from a present location to the destination until an amount of power available in power storage device 110 becomes 0.

Navigation device 150 selects the desired number of power supply stations 310 and specifies the route to the received destination via the selected desired number of power supply stations 310 in order from a power supply station 310 nearest to the present location, the desired number of power supply stations 310 being selected such that an amount of power with which electrically powered vehicle 100 is able to travel a distance obtained by adding a margin distance to a distance to a farthest power supply station 310 is less than the amount of power available in power storage device 110 when the route is specified.

Navigation device 150 reports an alert to the user when, during traveling on the specified route, the amount of power available in power storage device 110 is less than an amount of power required to travel the distance obtained by adding the margin distance to the distance to the farthest power supply station 310 of selected power supply stations 310.

Accordingly, since the route to the destination via the user's desired number of power supply stations 310 is specified, the user has a feeling of assurance by the manner of routing via power supply stations 310. Moreover, since the alert is reported to the user when the amount of power available in power storage device 110 is less than the amount of power required to travel the distance obtained by adding the margin distance to the distance to the farthest power supply station 310 on the route to the destination via the user's desired number of power supply stations 310, the user can be informed of a possibility of insufficiency of available power. When the alert is reported, selected power supply stations 310 are highly likely to be on the route to the farthest power supply station 310, thus providing options of charging at those power supply stations 310. Accordingly, the user's feeling of assurance can be improved. As a result, the user has a feeling of assurance by the manner of routing via power supply stations 310, and the user's feeling of assurance is improved by informing the user of the possibility of insufficiency of power available in power storage device 110.

Figure 2:
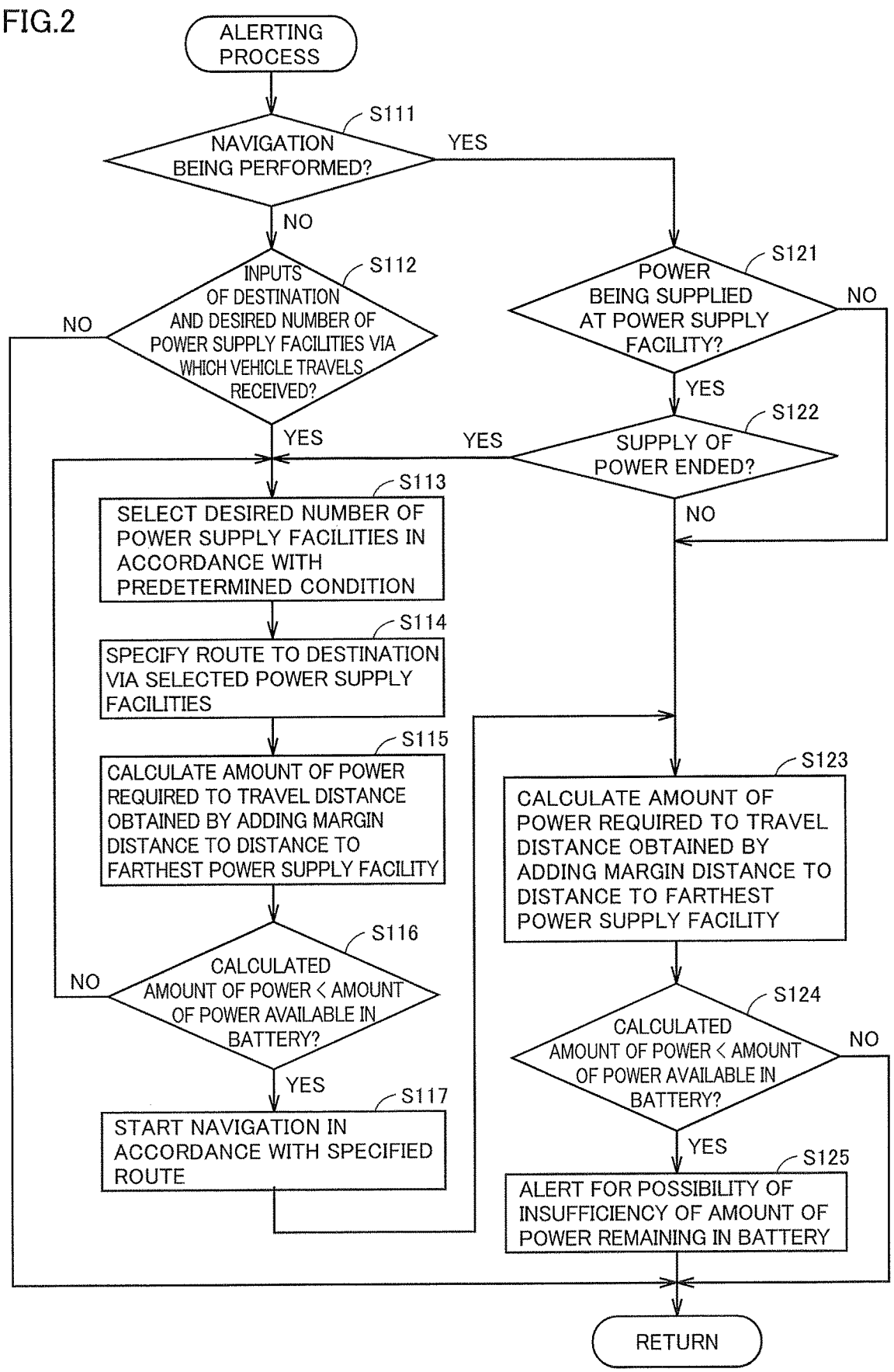
FIG. 2 is a flowchart showing a flow of an alerting process in the present embodiment.

The following describes control in the present embodiment. FIG. 2 is a flowchart showing a flow of the alerting process in the present embodiment. Whenever a predetermined control cycle (for example, several ten milliseconds) elapses, this alerting process is invoked from a superordinate process performed by CPU 151 of navigation device 150, and is then performed. With reference to FIG. 2, CPU 151 determines whether or not navigation is being performed at present (step S111).

When it is determined that navigation is not being performed (NO in step S111), CPU 151 determines whether or not an input of a destination and an input of the desired number of power supply stations 310 via which electrically powered vehicle 100 travels until the destination is reached are received from touch panel 153 (step S112). When it is determined that the inputs are not received (NO in step S112), CPU 151 returns the process to the process from which this alerting process has been invoked.

On the other hand, when it is determined that the input of the destination and the input of the desired number of power supply stations 310 via which electrically powered vehicle 100 travels are received (YES in step S112), CPU 151 selects the desired number of power supply stations 310 in accordance with a predetermined condition (step S113).

For example, the predetermined condition is such a condition that the desired number of power supply stations 310 are selected from power supply stations 310 located at farther locations within a distance that is less than a distance that can be reached until the amount of power available in power storage device 110 becomes 0 on the traveling route from the present location to the destination. A distance of a route from a certain point to another point can be calculated by a well-known technique conventionally used in navigation devices.

It should be noted that as the predetermined condition, a different condition may be employed. For example, the predetermined condition may be such a condition that a feature of a power supply station 310 is a predetermined feature (for example, such a condition that the user has a membership for power supply station 310, or such a condition that a unit price of power of power supply station 310 is less expensive than a predetermined price).

The predetermined condition may be such a condition that a traffic state indicated by traffic information is a predetermined state (for example, such a condition that a road in front of a power supply station 310 is not congested).

The predetermined condition may be such a condition that a correlation with the route from the present location to the destination is a predetermined correlation (for example, such a condition that a distance of deviation from the route from the present location to the destination is less than a predetermined value, or such a condition that a distance to a certain power supply station 310 at a location deviated from the route from the present location to the destination is smaller than a distance to another power supply station 310 at a location deviated from the route from the present location to the destination).

The predetermined condition may be such a condition that efficiency of the route from the present location to the destination via power supply stations 310 is comparatively good (such a condition that the route is not an inefficient detour; for example, such a condition that a ratio of the distance of the route from the present location to the destination via power supply stations 310 with respect to a distance of a route from the present location to the destination not via power supply stations 310 is less than a predetermined ratio (for example, 110%)). The predetermined condition may be a condition obtained by appropriately combining the above-described conditions.

Next, CPU 151 specifies the route to the destination via selected power supply stations 310 (step S114). A route to a destination via a certain place can be searched for by using a well-known technique conventionally used in navigation devices.

Then, CPU 151 calculates an amount of power required to travel a distance obtained by adding a margin distance to a distance to the farthest power supply station 310 on the specified route (step S115). It is assumed herein that the margin distance is a constant value (for example, 10 km). However, it is not limited to this, and the margin distance may be 0 km, i.e., the margin distance may not be included. Moreover, in order to allow the user to specify the margin distance, an input of the margin distance may be received in step S112, for example. The amount of power may be calculated in consideration of an operation state of a device that uses power in power storage device 110 such as an air conditioner (for example, whether or not the air conditioner is on or off), or may be calculated in consideration of a traveling mode of electrically powered vehicle 100 (for example, a normal traveling mode, a sport traveling mode (mode in which an acceleration with respect to an accelerator position is higher and power consumption is larger than those in the normal traveling mode), and an eco-traveling mode (mode in which an acceleration with respect to an accelerator position is lower and power consumption is smaller than those in the normal traveling mode).

By comparing the amount of power available in power storage device 110 at present with the amount of power calculated in step S115, CPU 151 determines whether or not the amount of power calculated in step S115 is less than the amount of power available in power storage device 110 (step S116). When it is determined that the calculated amount of power is more than or equal to the amount of power available in power storage device 110 (NO in step S116), i.e., when the distance obtained by adding the margin distance to the distance to the farthest power supply station 310 on the specified route cannot be traveled with the amount of power available in power storage device 110, CPU 151 performs the process of step S113 to step S115 again so as to reselect power supply stations 310 and specify a route again.

When it is determined that the calculated amount of power is less than the amount of power available in power storage device 110 (YES in step S116), i.e., when the distance obtained by adding the margin distance to the distance to the farthest power supply station 310 on the specified route can be traveled by the amount of power available in power storage device 110, CPU 151 starts navigation in accordance with the specified route (step S117).

When it is determined in step S111 that navigation is being performed (YES in step S111), CPU 151 communicates with, for example, ECU 128 to determine whether or not a signal indicating that power is being supplied is received, thereby determining whether or not electrically powered vehicle 100 is being supplied with power at a power supply station 310 (step S121). It should be noted that power supply station 310 that supplies power may be a power supply station 310 other than those selected in step S113.

When it is determined that power is being supplied (YES in step S121), CPU 151 communicates with, for example, ECU 128 to determine whether or not a signal indicating that the control for charging of power storage device 110 by charger 126 is ended is received, thereby determining whether or not the supply of power is ended (step S122).

When it is determined that the supply of power is ended (YES in step S122), CPU 151 performs the process of step S113 to step S117 again so as to reselect power supply stations 310 on a route to the destination from power supply station 310 having supplied the power and specify the route again, and resumes the navigation in accordance with the specified route.

On the other hand, when it is determined that power is not being supplied at power supply station 310 (NO in step S121), and when it is determined that the supply of power is not ended (NO in step S122), CPU 151 calculates the amount of power required to travel the distance obtained by adding the margin distance to the distance to the farthest power supply station 310 in the same manner as in step S115 (step S123).

CPU 151 determines whether or not the amount of power calculated in step S123 is more than the amount of power available in power storage device 110 at present (step S124). When it is determined that the calculated amount of power is more than the amount of power available in power storage device 110 at present (YES in step S124), i.e., the distance obtained by adding the margin distance to the distance to the farthest power supply station 310 on the specified route cannot be traveled with the amount of power available in power storage device 110 at present unless a certain measure is taken, CPU 151 presents a possibility of insufficiency of the amount of power available in power storage device 110 on display 154 as an alerting screen, whereby the possibility of insufficiency of the amount of power available in power storage device 110 is reported to the user (step S125).

FIG. 3 shows an exemplary alerting screen in the present embodiment. With reference to FIG. 3, the alerting screen presents not only a heading "WARNING: AMOUNT OF POWER REMAINING IN BATTERY DECREASED" indicating that the alerting screen is a screen for reporting the possibility of insufficiency of the amount of power available in power storage device 110, but also a distance that can be traveled with the amount of power available in power storage device 110 at present, such as "PRESENT TRAVELABLE DISTANCE 100 km".

Moreover, this alerting screen presents a present operation state ("AIR CONDITIONER: ON" in FIG. 3) of a device (for example, an air conditioner) that uses power of power storage device 110, and presents the present traveling mode ("TRAVELING MODE: ECO" in FIG. 3) of electrically powered vehicle 100.

Further, this alerting screen presents a distance from the present location to each place via which electrically powered vehicle 100 is to travel ("PRESENT LOCATION→CHARGING SPOT (1) 30 km", "CHARGING SPOT (1)→CHARGING SPOT (2) 30 km", and "CHARGING SPOT (2)→CHARGING SPOT (3) 30 km" in FIG. 3). Moreover, this alerting screen presents the margin distance ("EXTRA TRAVELABLE DISTANCE 10 km" in FIG. 3).

Turning back to FIG. 2, when it is determined that the amount of power calculated in step S123 is less than or equal to the amount of power available in power storage device 110 at present (NO in step S124), i.e., when the distance obtained by adding the margin distance to the distance to the farthest power supply station 310 on the specified route can be traveled with the amount of power available in power storage device 110 at present, after step S125, CPU 151 returns the process to the process from which this alerting process has been invoked.

[Modifications]

(1) The amount of power available in power storage device 110 in the above-described embodiment may be an amount of power available until the amount of power reaches a use lower limit SOC of power storage device 110 (for example, 10%), or may be an amount of power available until the amount of power becomes less than or equal to the use lower limit SOC (for example, 0%).

(2) In the above-described embodiment, the alerting process shown in FIG. 2 is performed by navigation device 150. However, it is not limited to this, and the alerting process shown in FIG. 2 may be performed by a different controller of electrically powered vehicle 100 such as ECU 128.

(3) In the above-described embodiment, the alert such as the alerting screen shown in FIG. 3 is presented on display 154 of navigation device 150. However, it is not limited to this and the alert may be presented on a different display unit such as a meter panel. Moreover, the alert may be a simple presentation instead of such a detailed presentation as shown in FIG. 3, or may be lighting of a warning lamp. Moreover, it is not limited to the presentation, and the alert may be reported by way of a sound/voice from a speaker in the passenger compartment.

(4) In the above-described embodiment, it is assumed that electrically powered vehicle 100 is an electric vehicle in which driving wheels 120 are driven only by motor generator 114 serving as a driving source. However, it is not limited to this. Electrically powered vehicle 100 may be an externally chargeable vehicle such as a plug-in hybrid vehicle that includes an engine as a driving source in addition to the motor generator and that can be externally charged.

(5) In the above-described embodiment, as described with regard to step S122 of FIG. 2, when the supply of power is ended at power supply station 310 via which electrically powered vehicle 100 travels, new power supply stations 310 are selected again and a route is specified again. However, it is not limited to this. Determination may be made as to whether or not the destination can be reached without supplying power at a power supply station 310 again. When it is determined that the destination can be reached, a power supply station 310 may not be reselected and a route may not be specified again. In this case, when the alerting screen of FIG. 3 is presented, the travelable distance in the alerting screen is changed to a travelable distance that is in consideration of the amount of power available in power storage device 110 after the charging.

Moreover, when power is supplied at a power supply station 310 other than the farthest power supply station 310 among power supply stations 310 initially selected and when it is determined that the destination can be reached without supply of power at a power supply station 310 again, a route to the destination not via remaining power supply stations 310 among power supply stations 310 initially selected may be searched for again and may be specified.

(6) In the above-described embodiment, it has been illustrated that the user's desired number of power supply facilities can be selected as indicated with regard to step S113 of FIG. 2. However, it is not limited to this. When the user's desired number of power supply facilities cannot be selected, the process after step S114 may be performed as long as at least one power supply facility is selected. When no power supply facility is selected in step S113, it is preferable to perform navigation in favor of avoiding shortage of power, rather than heading toward the destination, by changing the destination to the nearest power supply facility and heading toward the power supply facility.

(7) The above-described embodiment can be understood as disclosure of a alerting device of electrically powered vehicle 100 such as navigation device 150 that presents the alerting screen shown in FIG. 3. Moreover, the above-described embodiment can be understood as disclosure of an alerting method in the alerting device or disclosure of an alerting program in the alerting device.

[Effects]

(1) As described with reference to FIG. 1, navigation device 150 of electrically powered vehicle 100 is a navigation device 150 of an electrically powered vehicle 100 including a power storage device 110 that supplies power to be used for traveling. As indicated with regard to step S112 of FIG. 2, a CPU 151 of navigation device 150 receives an input of a destination from a user via a touch panel 153 and receives, from the user via touch panel 153, an input of a desired number of power supply stations 310 via which electrically powered vehicle 100 travels on a route from a present location to the destination until an amount of power available in power storage device 110 becomes 0.

As indicated with regard to step S113 to step S116 in FIG. 2, CPU 151 of navigation device 150 selects the desired number of power supply stations 310 and specifies the route to the received destination via the selected desired number of power supply stations 310 in order from a power supply station 310 nearest to the present location, the desired number of power supply stations 310 being selected such that an amount of power with which electrically powered vehicle 100 is able to travel a distance obtained by adding a margin distance to a distance to a farthest power supply station 310 is less than the amount of power available in power storage device 110 when the route is specified.

As indicated with regard to step S123 to step S125 in FIG. 2, CPU 151 of navigation device 150 reports an alert to the user by presenting an alerting screen shown in FIG. 3 when, during traveling on the specified route, the amount of power available in power storage device 110 is less than an amount of power required to travel the distance obtained by adding the margin distance to the distance to the farthest power supply station 310 of selected power supply stations 310.

Accordingly, since the route to the destination via the user's desired number of power supply stations 310 is specified, the user has a feeling of assurance by the manner of routing via power supply stations 310. Moreover, since the alert is reported to the user when the amount of power available in power storage device 110 is less than the amount of power required to travel the distance obtained by adding the margin distance to the distance to the farthest power supply station 310 on the route to the destination via the user's desired number of power supply stations 310, the user can be informed of a possibility of insufficiency of available power. When the alert is reported, selected power supply stations 310 are highly likely to be on the route to farthest power supply station 310, thus providing options of charging at those power supply stations 310. Accordingly, the user's feeling of assurance can be improved. As a result, the user can have a feeling of assurance by the manner of routing via power supply stations 310, and the user's feeling of assurance can be improved by informing the user of the possibility of insufficiency of power available in power storage device 110.

(2) As indicated with regard to step S115 in FIG. 2, the margin distance may be able to be set by the user. Accordingly, the user can have a feeling of assurance by the manner of routing via power supply stations 310, the user's feeling of assurance can be improved by informing the user of the possibility of insufficiency of power available in power storage device 110, and the user's feeling of assurance can be more improved because the user can set the margin distance by himself/herself.

(3) As indicated with regard to step S121 and step S122 in FIG. 2, when power is supplied at a power supply station 310 selected in step S113 or power is supplied at another power supply station 310 not selected, as indicated with regard to step S113 to step S116 in FIG. 2, CPU 151 of navigation device 150 selects the desired number of power supply stations 310 again and specifies again a route to the received destination via the selected desired number of power supply stations 310 in order from a power supply station 310 nearest to the present location, the desired number of power supply stations 310 being selected such that an amount of power with which electrically powered vehicle 100 is able to travel the distance obtained by adding the margin distance to the distance to the farthest power supply station 310 is less than the amount of power available in power storage device 110 after the supply of power when the route is specified. Accordingly, the user can have a feeling of assurance by the manner of routing via power supply stations 310, and the user's feeling of assurance can be improved by informing the user of the possibility of insufficiency of power available in power storage device 110.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. An alerting device of an electrically powered vehicle including a power storage device that supplies power to be used for traveling, the alerting device comprising:

a navigation device including a processor, a touch panel, and a display, the navigation device being wirelessly connected to a remote data center that provides power supply facility information, wherein the touch panel is configured to receive a user input of (i) a destination, (ii) a desired number of power supply facilities for a route to the destination, and (iii) a required feature of the power supply facilities;

wherein the processor is programmed to:

obtain a present location of the vehicle from a global positioning system (GPS), determine whether the destination, the desired number of power supply facilities, and the requirements of the power supply facilities has been input;

based upon a determination that (i) the destination, (ii) the desired number of power supply facilities, and (iii) the required feature of the power supply facilities has been input, select power supply facilities, from among the power supply information provided by the remote data center, that satisfy (i) the destination, (ii) the desired number of power supply facilities; and (iii) the required feature of the power supply facilities;

specify the route to the destination via the selected power supply facilities in an order starting from a power supply facility nearest to the present location obtained from the GPS;

start navigation in accordance with the specified route;

during travel on the specified route, calculate an amount of power required to travel a travel distance to the farthest power supply facility from amongst the selected power supply facilities of the specified route, wherein the travel distance is obtained by adding a margin distance to an actual distance to the farthest power supply facility;

determine whether an amount of power available in the battery is less than the amount of power required to travel the travel distance; and alert the user when, during traveling on the specified route, the amount of power available in the power storage device is less than the amount of power required to travel the travel distance to the farthest power supply facility of the selected power supply facilities.

2. The alerting device of the electrically powered vehicle according to claim 1, wherein the margin distance is set by the user.

3. The alerting device of the electrically powered vehicle according to claim 1, wherein the alert is displayed on a display screen of the navigation device, and the alert includes information of a distance from the present location to each of the selected power supply facilities and the margin distance.

* * * * *